(12) United States Patent
Fabian

(10) Patent No.: US 6,230,099 B1
(45) Date of Patent: May 8, 2001

(54) METHOD OF DETERMINING A ROUTE FROM A STARTING POINT TO A DESTINATION IN A ROUTE NETWORK

(75) Inventor: Thomas Fabian, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/354,559

(22) Filed: Jul. 15, 1999

(30) Foreign Application Priority Data

Aug. 12, 1998 (DE) .............................................. 198 36 485

(51) Int. Cl.⁷ .................................................. G01C 21/00
(52) U.S. Cl. ............................................................ 701/209
(58) Field of Search .................................... 701/209, 208

(56) References Cited

U.S. PATENT DOCUMENTS

| | | | |
|---|---|---|---|
| 4,984,168 | 1/1991 | Neukrichner et al. ............... | 701/210 |
| 5,938,720 | 8/1999 | Tamai ................................... | 701/209 |
| 5,978,733 | 11/1999 | Deshimaru et al. ................. | 701/209 |

*Primary Examiner*—Gregory C. Issing
(74) *Attorney, Agent, or Firm*—Michael J. Striker

(57) ABSTRACT

In the method of determining a route from a starting point to a destination in a route network represented by a group of straight edges and nodes in a memory, especially a road network, each straight edge is correlated with a respective path resistance and the route is defined as a successive sequence of edges. The successive sequence of edges is determined by minimizing the sum of all path resistances. Each edge is also associated with at least one traffic-way-type path resistance value. The at least one traffic-way-type resistance value is first minimized during determination of a portion of the route from one edge to a following edge and only in the case that the traffic-way-type resistance value does not increase or decrease from one edge to the next is a minimization of the resistance performed for that portion of the route.

14 Claims, 6 Drawing Sheets

METHOD OF DETERMINING A ROUTE FROM A STARTING POINT TO A DESTINATION IN A ROUTE NETWORK

BACKGROUND OF THE INVENTION

1. Field of the Invention

The present invention relates to a method of determining a route from a starting point to a destination in a route network, especially a network of roads or streets, which is represented by a group of straight edges and nodes in a memory, in which each edge is correlated with a path resistance and the route is determined as a successive sequence of edges by minimizing the sum of all the path resistances.

2. Prior Art

In vehicles, such as motor vehicles, aircraft or ships, installed navigation systems guide the driver of the vehicle rapidly, reliably and easily to the desired destination, without the previous effort of planing a route and acquiring and studying map or chart materials. Navigation data is stored, for example on CD-ROM, in navigation systems, which includes appropriate data from charts, maps or road maps. The navigation apparatus, for example, uses GPS (Global Positioning System), in order to establish a momentary position and to compute appropriate navigation directions for guidance to a predetermined destination. The navigation data preferably includes data regarding streets and roads for a motor vehicle.

Suitable algorithms for route planning have been used in navigation systems, which compute an optimum route of travel from a starting point to a destination using stored navigation data together with the starting point and the destination. This sort of algorithm for route planning is based on the best path algorithms according to Ford and Moore, which are known from graph theory and are adjusted to the special requirements of self-sufficient vehicle navigation systems.

As is apparent from FIG. 1, the road network is represented by a route algorithm such as a graph with edges k and nodes p, for mathematical processing in which the edges correspond to roads or streets and the nodes correspond to intersections of the roads or road network. In FIG. 1 four edges $k_1$, $k_2$, $k_3$ and $k_4$ and four nodes $p_1$, $p_2$, $p_3$ and $p_4$ are provided. Since the traffic flow is directional in real road traffic, an edge k must be represented as a directional vector. Furthermore a resistance, the so-called path resistance, which is a variable representing the effort required to travel from one node in the network to another, is associated with each edge k. For example, the edge length is used as the path resistance. Alternatively the travel time along the edge can be used as the path resistance, thus including the average travel speed along the respective edge. In a further alternative embodiment a cost function is provided, which involves a weighted mixed computation of various properties, such as the edge length, travel time on an edge or the width of an edge (construction condition). Also a resistance is associated with the respective nodes, which reflects the cost of vehicle maneuvers (straight out, left/right deviations, turns, etc). All best path algorithms determine only a route between a starting edge and a destination edge on a directional graph with the property that the sum of all road resistances of the edges of the determined route and if necessary with the node resistance considered is minimized.

This sort of best path algorithm calculates the route by reverse iteration and tests all edges in the graph, evaluating them in relation to the best path to the destination road or edge. In other words, starting from the destination edge, in each iteration step a best path in regard to resistance back to the edges in the list which were optimized in the previous iteration step is determined. As a result the method provides an optimum route to the destination edge from each edge in the graph. A so-called route table for the calculated result is set up in the memory of the navigation device. This sort of route table is shown for example below for the graph shown in FIG. 1.

TABLE I

| | ROUTE | | | |
|---|---|---|---|---|
| Edge | +Resistance | +Following edge | −Resistance | −Following edge |
| $K_1$ | ∞ | − | ∞ | − |
| $K_2$ | ∞ | − | ∞ | − |
| $K_3$ | ∞ | − | ∞ | − |
| $K_4$ | ∞ | − | ∞ | − |

For each edge in the graph the resistance to the destination edge in the graph and the edge following in the destination direction are given. The resistance is given an "infinite" value (symbol ∞) and the following edge is set as "undefined" (symbol −) as respective initial values. A positive sign in the resistance and following edge columns stands for consideration of the respective edge in its arrow direction, whereas a negative sign stands for consideration of the respective edge opposite to its arrow direction.

Before the start of the iterative optimization the destination edge in the route table is initialized (see above) with a null resistance. As an example the edge $k_3$ is selected to be that destination edge. The following stored route table II results from a destination initialization.

TABLE II

| | ROUTE | | | |
|---|---|---|---|---|
| Edge | +Resistance | +Following edge | −Resistance | −Following edge |
| $K_1$ | ∞ | − | ∞ | − |
| $K_2$ | ∞ | − | ∞ | − |
| $K_3$ | 0 | − | 0 | − |
| $K_4$ | ∞ | − | ∞ | − |

Furthermore the destination edge $k_3$ is added to a list stored in the navigation device of the already optimized edges, so that a list of the already optimized edges according to the following list 1 results.

LIST I OF ALREADY OPTIMIZED EDGES

| +$k_3$ | | | | |
|---|---|---|---|---|

Furthermore a second list of the edges to be tested in the next optimization step is provided, which is empty at the start of the method, according to the following list I.

LIST II OF THE EDGES TO BE TESTED DURING THE NEXT STEP

|  |  |  |  |  |
|--|--|--|--|--|
|  |  |  |  |  |

The method now starts, since it consider all edges listed in List I as fixed actual positions of the vehicle and all edges interconnected with this "actual-edge", the so-called "incoming-edges", participating in the optimization. In the exemplary embodiment (FIG. 1) the edges interconnected with the "actual-edge" read $+k_2$, $-k_3$ and $-k_4$. In the optimization testing now the resistance of a respective incoming-edge is compared with the resistance to the destination that the incoming-edge would have when it leads to the destination over the actual-edge. At this point a so-called resistance optimization condition is set forth:

Resistance(incoming edge)>path resistance (incoming-edge)+ Resistance(actual edge).

Here "resistance" represents the resistance added into the route table and "path resistance" represents a path resistance associated with a respective edge in the graph. When this resistance optimization condition is fulfilled, the resistance of the incoming-edge in the route table is replaced by the new smaller value, the actual-edge is entered as the following edge and the optimized incoming edge is input to the list II. If all edges from the list 1, as already described, are processed, the list I and list II are interchanged and subsequently the list 2 is empty. The process ends when list 1 is found to be empty.

Subsequently this process will be explained in more detailed using the road network according to FIG. 1. In this embodiment the edges $k_1$, $k_2$ and $k_3$ have the path resistance 10 and the edge $k_4$ has the path resistance 30. Sine the sol-called turning resistance is not of significance for this process, it remains unconsidered in the present example. In step 1 the actual-edge is set equal to $+k_3$ and the list I is as follows:

LIST I OF ALREADY OPTIMIZED EDGES

| $+k_3$ |  |  |  |  |
|--|--|--|--|--|

Now all incoming-edges for $+k_3$ are tested with the resistance optimization conditions, as illustrated in FIG. 2. The resistance optimization conditions results:

$-k_3$ 0>10+0 resistance optimization condition not fulfilled $+k_2$ ∞>10+0 resistance optimization condition fulfilled $-k_4$ ∞>30+0 resistance optimization conduction fulfilled.

At the end of step 1 the following contents result for list II and the route table III:

LIST II OF THE EDGES TO BE TESTED DURING THE NEXT STEP

| $+k_2$ | $-k_4$ |  |  |  |
|--|--|--|--|--|

TABLE III

| | | ROUTE | | |
|--|--|--|--|--|
| Edge | +Resistance | +Following edge | −Resistance | −Following edge |
| $K_1$ | ∞ | − | ∞ | − |
| $K_2$ | 10 | $+k_3$ | ∞ | − |
| $K_3$ | 0 | − | 0 | − |
| $K_4$ | ∞ | − | 30 | $+k_3$ |

Now the lists I and II are exchanged and the list II is empty. Step 2 starts with a new list I with the following contents:

LIST I OF ALREADY OPTIMIZED EDGES

| $+k_2$ | $-k_4$ |  |  |  |
|--|--|--|--|--|

In step 2.1 all incoming-edges for the edge $k_2$ are tested with the resistance optimization condition, as also illustrated in FIG. 3, and the contents of the route table IV and list II are as follows:

LIST II OF THE EDGES TO BE TESTED DURING THE NEXT STEP

| $+k_1$ | $+k_4$ | $-k_2$ |  |  |
|--|--|--|--|--|

TABLE IV

| | | ROUTE | | |
|--|--|--|--|--|
| Edge | +Resistance | +Following edge | −Resistance | −Following edge |
| $K_1$ | 20 | $+k_2$ | ∞ | − |
| $K_2$ | 10 | $+k_3$ | 20 | $+k_2$ |
| $K_3$ | 0 | − | 0 | − |
| $K_4$ | 40 | $+k_2$ | 30 | $+k_3$ |

In the following step 2.2 all incoming-edges for the edge $-k_4$ are tested with the resistance optimization condition, as illustrated in FIG. 4, and the following contents results for list II and the route table V:

LIST II OF THE EDGES TO BE TESTED DURING THE NEXT STEP

| $+k_1$ | $+k_4$ | $-k_2$ |  |  |
|--|--|--|--|--|

TABLE V

| | | ROUTE | | |
|--|--|--|--|--|
| Edge | +Resistance | +Following edge | −Resistance | −Following edge |
| $K_1$ | 20 | $+k_2$ | ∞ | − |
| $K_2$ | 10 | $+k_3$ | 20 | $+k_2$ |
| $K_3$ | 0 | − | 0 | − |
| $K_4$ | 40 | $+k_2$ | 30 | $+k_3$ |

The lists I and II are interchanged and the list II is empty. The next step 3 then begins with a list I with the following contents:

LIST I OF ALREADY OPTIMIZED EDGES

| +k₁ | +k₄ | -k₂ | | |
|---|---|---|---|---|

The iteration now takes place step after step until the following route table VI results after termination of the algorithm:

TABLE VI

RESULTING ROUTE

| Edge | +Resistance | +Following edge | −Resistance | −Following edge |
|---|---|---|---|---|
| K₁ | 20 | +k₂ | 30 | −k₁ |
| K₂ | 10 | +k₃ | 20 | +k₂ |
| K₃ | 0 | − | 0 | − |
| K₄ | 40 | +k₂ | 30 | +k₃ |

Thus according to this route table the edge +k₁ has the following edge +k₂, the edge +k₂ has the following edge +k₃ and the edge +k₃ has no following edge, i.e. the destination has been reached. This determined route is illustrated in FIG. 5 with a dashed arrow.

Frequently a driver is unwilling to travel on express highways or would like to avoid toll roads and/or certain roads because of cost, for example. Also it is conceivable that a driver would like to avoid as much tunnel travel as possible. Up to now calculated routes do not include these considerations or include them only with great effort since they directly increase the resistance values for the respective edges accordingly. However this does not always lead to the desired result, since some edges are essentially cut out from the route by the direct changes of their resistance values. The topography and path guidance may often however lead to no route or only one circuitous route which is very round about which in fact contains none of the excluded types of vehicle paths. Often conventional route determinations end without any results because of the exclusion of too many edges. The opposite can occur also, namely that the computed route leads over an individual excluded edge because the increase of the path resistance of this edge is insufficient. In fact it would be desirable, for example, to only obtain a route with minimal express highway travel distance instead of excluding all edges from the express highway. Also up to now known navigation devices are not in a position to do this.

Furthermore the effect of the path resistances is disadvantageous, since this path resistance can be manipulated for other purposes, especially in traffic telematics. Thus the effect of these methods on the tested routes cannot be predicted.

SUMMARY OF THE INVENTION

It is an object of the present invention to provide an improved method of the above-described kind, which avoids the above-described disadvantages and permits a desired selective minimization of predetermined vehicle paths during route calculation.

This object and others which will be made more apparent hereinafter is attained in a method of determining a route from a starting point to a destination in a route network, especially a network of roads or streets, which is represented by a group of straight edges and nodes in a memory, in which each edge is correlated with a path resistance and the route is determined as a successive sequence of edges by minimizing the sum of all the path resistances.

In the method according to the invention each edge is also associated with at least one traffic-way-type path resistance value, wherein primarily the at least one traffic-way-type resistance value is minimized during the determination of the route from one edge to the next edge and only in the case that this traffic-way-type resistance value does not increase or decrease from one edge to the next is a minimization of the resistance performed at this point.

This has the advantage that as a result of this method a route is always obtained which uses a stretch of roadway to be avoided, such as an express highway or through street, as little as possible. Thus in a simple way different undesirable types of traffic or roadways can be considered in determining the route. Furthermore a simple combination with already known methods is possible, in which a fastest route or a shortest route is calculated by means of a street classification-dependent path resistance. Since the path resistance values for minimization of certain roadway types are not touched, they remain free for other actions related to route dynamics, such as for traffic telematics.

Various preferred embodiments of the invention are described hereinbelow and claimed in the appended dependent claims.

For example, in a preferred embodiment the traffic-way-type path resistance value for a respective edge gives the sum of all paths on which that respective edge has a predetermined traffic-way type, for example an express highway, a country road, a ferry, a through street, a tunnel or the like. This has the additional advantage that the sum of all the traffic-way-type path resistance values of the calculated route immediately gives the length of the undesired path section remaining in the calculated route. In as much as this can be transmitted or signaled to the user after route determination, this can provide a check, in as much as the criteria predetermined by it for the road sections to be avoided or its route options are adhered to. An additional outstanding advantage of the traffic-way-type path resistance value is the inclusion of the frequency of various events associated with an edge in a preferred embodiment of the route selection method, for example the frequency of traffic accidents, the number of radar traps or the number of road lights. The traffic-way-type path resistance value serves if necessary also for inclusion of other physical properties in the route calculations, for example pollutant emissions, which are associated with an edge, in order to avoid smog-endangered areas during the route selection. The properties associated with an edge which are to be included in the traffic-way-type path resistance values are input optionally by means of traffic telematics directly, for example by an online service provider, for example via GSM, into a navigation device including the memory. For example, a polygon is transmitted which marks a region on a digital map, inside of which all edges are correlated with a predetermined property.

In another preferred embodiment the consideration of at least one traffic-way-type path resistance value in the route computation is selectively activated or deactivated by a user in an appropriate manner.

In a particularly preferred embodiment the route calculation occurs by an iteration method starting from the desired edge initially.

In an especially preferred embodiment the method includes the following steps:

(1) setting up a route table in which a respective resistance value, following edge value and traffic-way-type value are entered for each straight edge in a forward direction and in a back direction;

(2) setting all resistance values and all traffic-way-type values of the route table to infinity and clearing all following edge values;
(3) setting the resistance value and traffic-way-type value of the destination edge to zero;
(4) storing the destination edge in a first list for already optimized edges;
(5) setting up of an empty second list for edges to be optimized in the next step;
(6) determining whether or not the first list is empty, and if a positive result is obtained the method is halted;
(7) picking an edge from the first list as the actual edge;
(8) defining all edges interconnected with the actual edge as incoming edges;
(9) determining for all incoming edges whether or not an optimization condition, traffic-way-type value (incoming edge)>traffic-way-type path value (incoming-edge)+traffic-way-type value (actual edge), is fulfilled and if it is fulfilled proceeding to step 10 but if it is not fulfilled jumping to step 11;
(10) entering the respective incoming edge in the second list, setting the resistance values of the respective incoming edge in the route table to the sum (path resistance (incoming edge)+resistance (actual edge)), setting the traffic-way-type value of the respective incoming edge in the route table to the sum (traffic-way-type path value (incoming edge)+traffic-way-type value (actual edge)) and entering the actual edge as the following edge of the respective incoming edge and then jumping to step (12);
(11) rejecting the respective incoming edge if
   traffic-way-type value(incoming edge)<traffic-way-type path value (incoming-edge)+traffic-way-type value (actual edge), or when
   traffic-way-type value(incoming edge)=traffic-way-type path value (incoming-edge)+traffic-way-type value (actual edge), determining for the respective incoming edge whether or not the optimization condition
   resistance (incoming edge)>path resistance (incoming-edge)+resistance (actual edge),
   is fulfilled, and when it is fulfilled, entering the respective incoming edge in the second list, setting the resistance value of the respective incoming edge in the route table to the sum (path resistance (incoming edge)+resistance (actual edge)), setting the traffic-way-type value of the respective incoming edge in the route table to the sum (traffic-way-type path value (incoming edge)+traffic-way-type value (actual edge)) and entering the actual edge as the following edge of the respective incoming edge, but when it is not fulfilled rejecting the incoming edge;
(12) setting another edge from the first list as actual edge and going to step (8), or going to step (13) when already all edges contained in the first list were set as the actual edges; and
(13) exchanging the first list with the second list, clearing the second list and jumping to step (6).

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
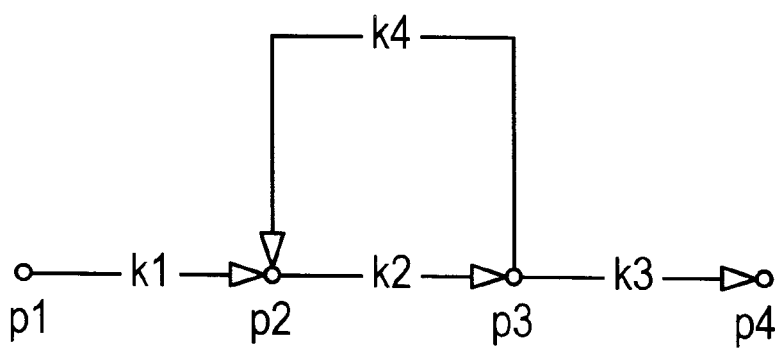
FIGS. 1 to 9 are respective diagrammatic views showing different steps of a method for determination of a route through one example of a roadway network of straight edges and nodes.
Figure 2:
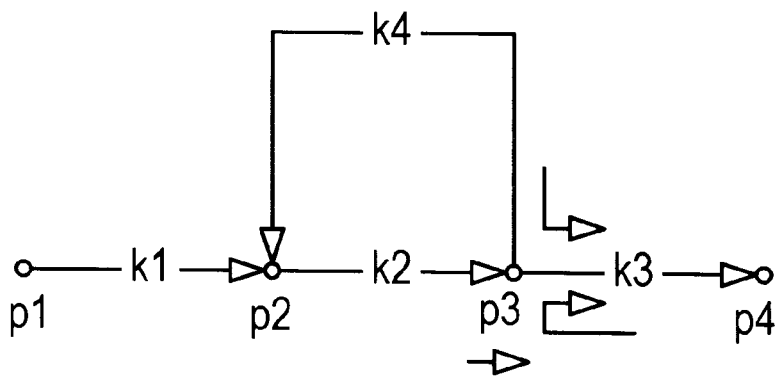
Figure 3:
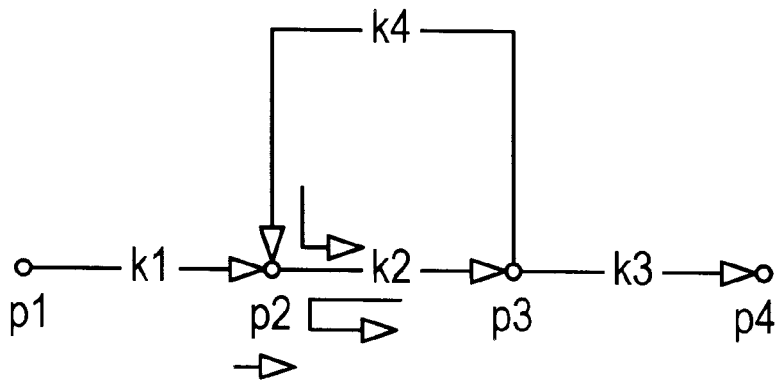
Figure 4:
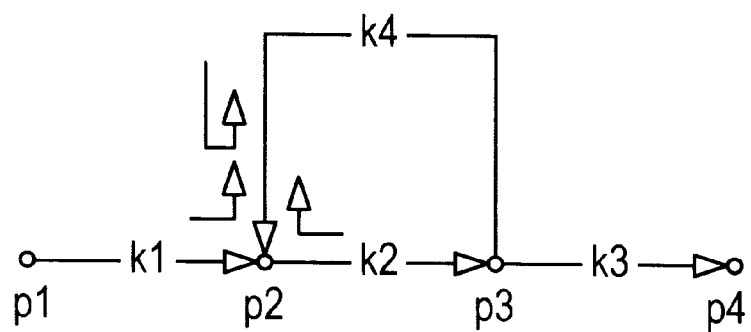
Figure 5:
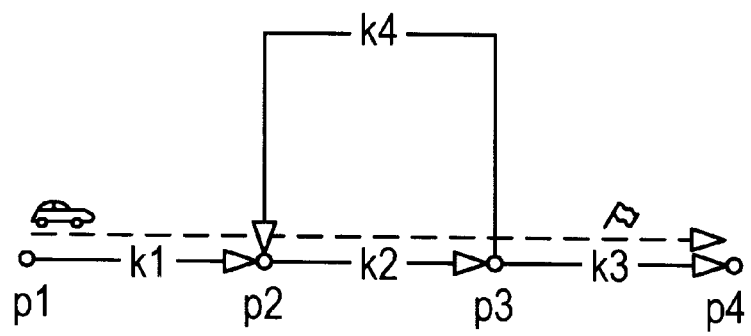

The subsequent explanation of the method according to the invention is assisted by FIGS. 6 to 12, which is based on the situation illustrated above with reference to FIGS. 1 to 5 for a real road network as a network of nodes p and edges k and the associated terminology.

According to the invention an additional route option is provided by means of which a predetermined portion or stretch of roadway or edge is avoided in the route calculation. Moreover each edge is correlated with a route options-relevant path part, subsequently designated as a "ROSA value" or "traffic-way-type resistance value". This value characterizes, for example, the length of a portion along the respective edge of a predetermined road type, such as express highway, federal highway, country road, state road, local road, tunnel, underpass, through street, dangerous stretch of roadway, curved stretch of road, accident prone roadway stretch, stretch of road undergoing construction or repair, stretch of road with predetermined speed limits, bridge, traffic congestion prone stretch of roadway and/or local throughway or the like. This ROSA value is selected for each edge in and opposite to its travel direction (+ROSA, −ROSA). The roadway type is freely selected by the user, for example, prior to route computation. Activatable/deactivatable route options are available.

The ROSA value of a calculated route thus gives the sum of all long portions to be avoided until at the destination edge. If, for example, the route options "avoid ferries" and "avoid express highways" are activated and one edge has a ROSA value of 1000 m, this means that 1000 m of this edge must be covered on ferries and/or express highway in order to reach the desired destination.

A central feature of the invention is that the method calculates a route that has a minimum ROSA value in comparison to all other alternative routes.

The method according to the invention also manages two columns in the route table for the ROSA values of the respective edges in and opposite to their direction. For conceptual clarification it should be explicitly mentioned that "resistance" or"traffic-way-type resistance value" or "ROSA value" designates a value entered in the route table, where in contrast "path resistance" or "traffic-way-type resistance path value" or "ROSA path value" designates a value correlated with an edge in the embodiment of the route network comprising edges and nodes.

On initializing the method according to the invention the ROSA value of all edges is set to infinity (symbol ∞). The destination edge has the null ROSA value and the null resistance value. In the above example illustrated in FIGS. 1 to 5 the following route table results after starting:

TABLE VII

| | | | ROUTE | | | |
|---|---|---|---|---|---|---|
| Edge | + Resistance | +ROSA | + Following edge | − Resistance | −ROSA | − Following edge |
| $K_1$ | ∞ | ∞ | − | ∞ | ∞ | − |
| $K_2$ | ∞ | ∞ | − | ∞ | ∞ | − |
| $K_3$ | 0 | 0 | − | 0 | 0 | − |
| $K_4$ | ∞ | ∞ | − | ∞ | ∞ | − |

Furthermore the destination edge should be $+k_3$ again, which is entered as an initial point of the iterative route computation in a first list of already optimized edges.

LIST I OF ALREADY OPTIMIZED EDGES

| $+k_3$ | | | | |
|---|---|---|---|---|

A second list for edges to be tested in the next step because available. This second list is empty after the initialization.

LIST II OF THE EDGES TO BE TESTED DURING THE NEXT STEP

| | | | | |
|---|---|---|---|---|

According to the invention now an additional optimization test of the ROSA value of the respective tested incoming edges is performed with the following optimization condition prior to optimization testing of the resistance:

ROSA value(incoming edge)>ROSA path value (incoming edge)+ ROSA value (actual edge).

The ROSA path value of an incoming edge is determined from the sum of all the road sections or highway types to be avoided on this edge. It should be explicitly pointed out that presently the terms "ROSA value" or "ROSA path value" and "traffic-way-type value" or "traffic-way-type path resistance value" are considered synonymous.

When the ROSA optimization condition is fulfilled, then the incoming edge is optimized independently of whether its resistance to the destination increases or not. In other words, the ROSA value of the incoming edge is replaced by the new lower value, the resistance of the incoming edge is actualized in the route table, the actual edge is entered as the following edge in the route table and the optimized incoming edge is entered in the second list.

When the ROSA optimization condition is not fulfilled then two cases differ.

A testing of the resistance optimization condition occurs when ROSA value (incoming edge)=ROSA path value (incoming edge)+ROSA value (actual edge) or the incoming edge is rejected as not optimized and the method continues with the next incoming edge to be tested, when ROSA value (incoming edge)<ROSA path value (incoming edge)+ROSA value (actual edge).

Subsequently the method according to the invention is illustrated with the aid of an example for improved understanding that should not be considered as limiting the broader concept of the invention as claimed in the appended claims appended hereinbelow.

Figure 6:
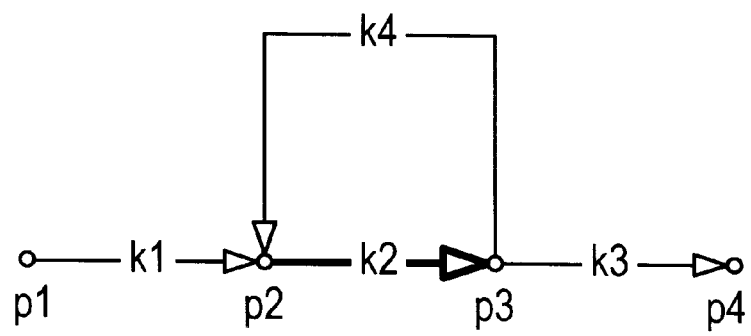

When the route option "avoid express highways" is activated and the resistance values are selected as in the example of FIGS. 1 to 5, namely the path resistances for $k_1$, $k_2$, $k_3$=10 and the path resistance for $k_4$=30. The edge $k_2$ should be kept an express highway and its ROSA path value amounts to 10 m. The destination edge should be $+k_3$. This situation is illustrated in FIG. 6.

Step 1 is based on the following first list:

LIST I OF ALREADY OPTIMIZED EDGES

| $+k_3$ | | | | |
|---|---|---|---|---|

Figure 7:
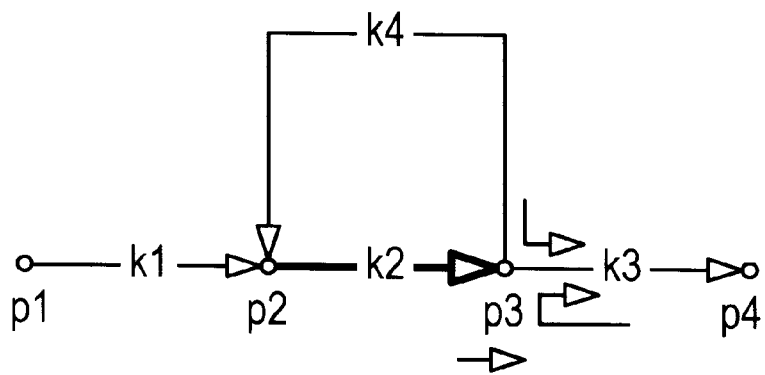

Now all incoming edges of $k_3$ are tested in the ROSA optimization condition, as illustrated in FIG. 7. The respective ROSA optimization condition results as follows:

$-k_3$: 0>10+0 ROSA optimization condition not fulfilled $+k_2$: ∞>10+0 ROSA optimization condition fulfilled $-k_4$: ∞>0+0 ROSA optimization condition fulfilled.

List II and the route table VIII have the following contents at the end of step 1:

LIST II OF THE EDGES TO BE TESTED DURING THE NEXT STEP

| $+k_2$ | $-k_4$ | | | |
|---|---|---|---|---|

TABLE VIII

| | | | ROUTE | | | |
|---|---|---|---|---|---|---|
| Edge | + Resistance | +ROSA | + Following edge | − Resistance | −ROSA | − Following edge |
| $K_1$ | ∞ | ∞ | − | ∞ | ∞ | − |
| $K_2$ | 10 | 10 | $+k_3$ | ∞ | ∞ | − |
| $K_3$ | 0 | 0 | − | 0 | 0 | − |
| $K_4$ | ∞ | ∞ | − | 10 | 0 | $+k_3$ |

Now lists I and II are exchanged and list II is empty. Step 2 begins with list I with the following contents:

LIST I OF ALREADY OPTIMIZED EDGES

| $+k_2$ | $-k_4$ | | | |
|---|---|---|---|---|

Figure 8:
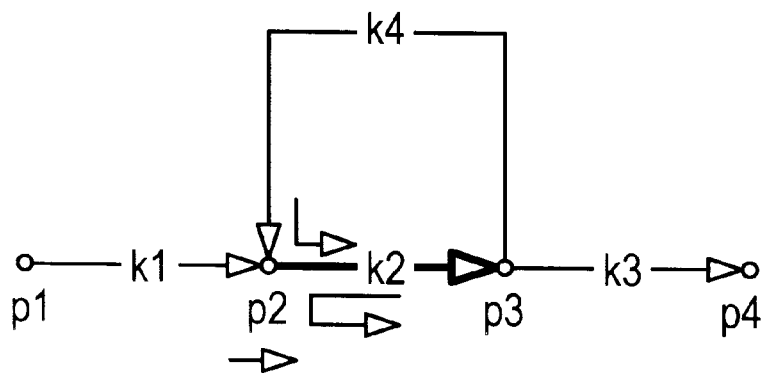

In step 2.1 all incoming edges of the edge $+k_2$ are tested with the ROSA optimization condition, as illustrated in FIG. 8, and the following ROSA optimization condition and contents of the route table IX and list II result:

$+k_1$: ∞>0+10 ROSA optimization condition fulfilled $+k_4$: ∞>0+10 ROSA optimization condition fulfilled $-k_2$: ∞>10+10 ROSA optimization condition fulfilled.

LIST II OF THE EDGES TO BE TESTED DURING THE NEXT STEP

| $+k_1$ | $+k_4$ | $-k_2$ | | |
|---|---|---|---|---|

TABLE IX

| | | | ROUTE | | | |
|---|---|---|---|---|---|---|
| Edge | + Resistance | +ROSA | + Following edge | − Resistance | −ROSA | − Following edge |
| $K_1$ | 20 | 10 | $+k_2$ | ∞ | ∞ | − |
| $K_2$ | 10 | 10 | $+k_3$ | 20 | 20 | − |
| $K_3$ | 0 | 0 | − | 0 | 0 | − |
| $K_4$ | 40 | 10 | $+k_2$ | 30 | 0 | $+k_3$ |

Figure 9:
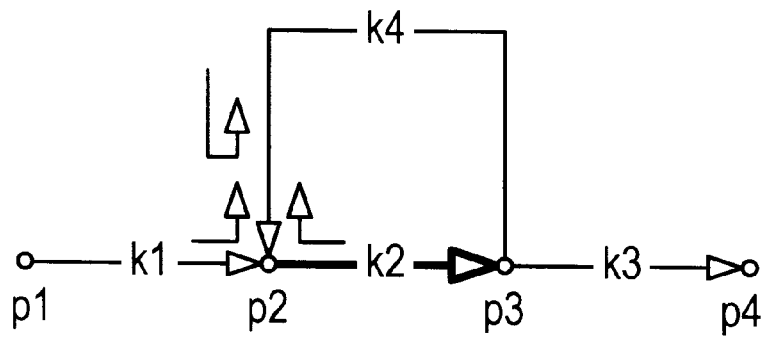

In the following step 2.2 all incoming edges of the edge $-K_4$ are tested with the ROSA optimization condition, as illustrated in FIG. 9. The ROSA optimization condition and the contents of the ROUTE TABLE X and list 2 are as follows:

$+k_1$: 10>0+0 ROSA optimization condition fulfilled
$+k_4$: 10>0+0 ROSA optimization condition fulfilled
$-k_2$: 20>10+0 ROSA optimization condition fulfilled.

LIST II OF THE EDGES TO BE TESTED DURING THE NEXT STEP

| $+k_1$ | $+k_4$ | $-k_2$ | | |
|---|---|---|---|---|

TABLE X

| | | | ROUTE | | | |
|---|---|---|---|---|---|---|
| Edge | + Resistance | +ROSA | + Following edge | − Resistance | −ROSA | − Following edge |
| $K_1$ | 40 | 0 | $-k_4$ | ∞ | ∞ | − |
| $K_2$ | 10 | 10 | $+k_3$ | 40 | 10 | $-k_4$ |
| $K_3$ | 0 | 0 | − | 0 | 0 | − |
| $K_4$ | 60 | $-k_4$ | 30 | 0 | $+k_3$ | |

In this step the action of the ROSA optimization is especially clear: The incoming edge $+k_1$ leads in the example of FIGS. 1 to 5 over the following edge $+k_2$ to the destination. Since now however in travel over $+k_4$ to the destination the ROSA value drops from 10 to 0, because of the fulfilled ROSA optimization condition the edge $-k_4$ is entered in the route table as the following edge. In other words, the express highway, as desired, is avoided, although the resistance to the destination increases from 20 to 40.

The ROSA optimization condition is also fulfilled for the remaining incoming edges $-k_2$ and $+k_4$. Because of that $-k_2$ becomes the following edge in place of $+k_2$ now $-k_4$ (the route then is guided away from the express highway, instead of to it) and $+k_4$ becomes the following edge in place of $+k_2$ now $-k_4$.

The process now continues in a similar way with steps 3,4; until at the beginning of an iteration step the first list is empty.

Figure 10:
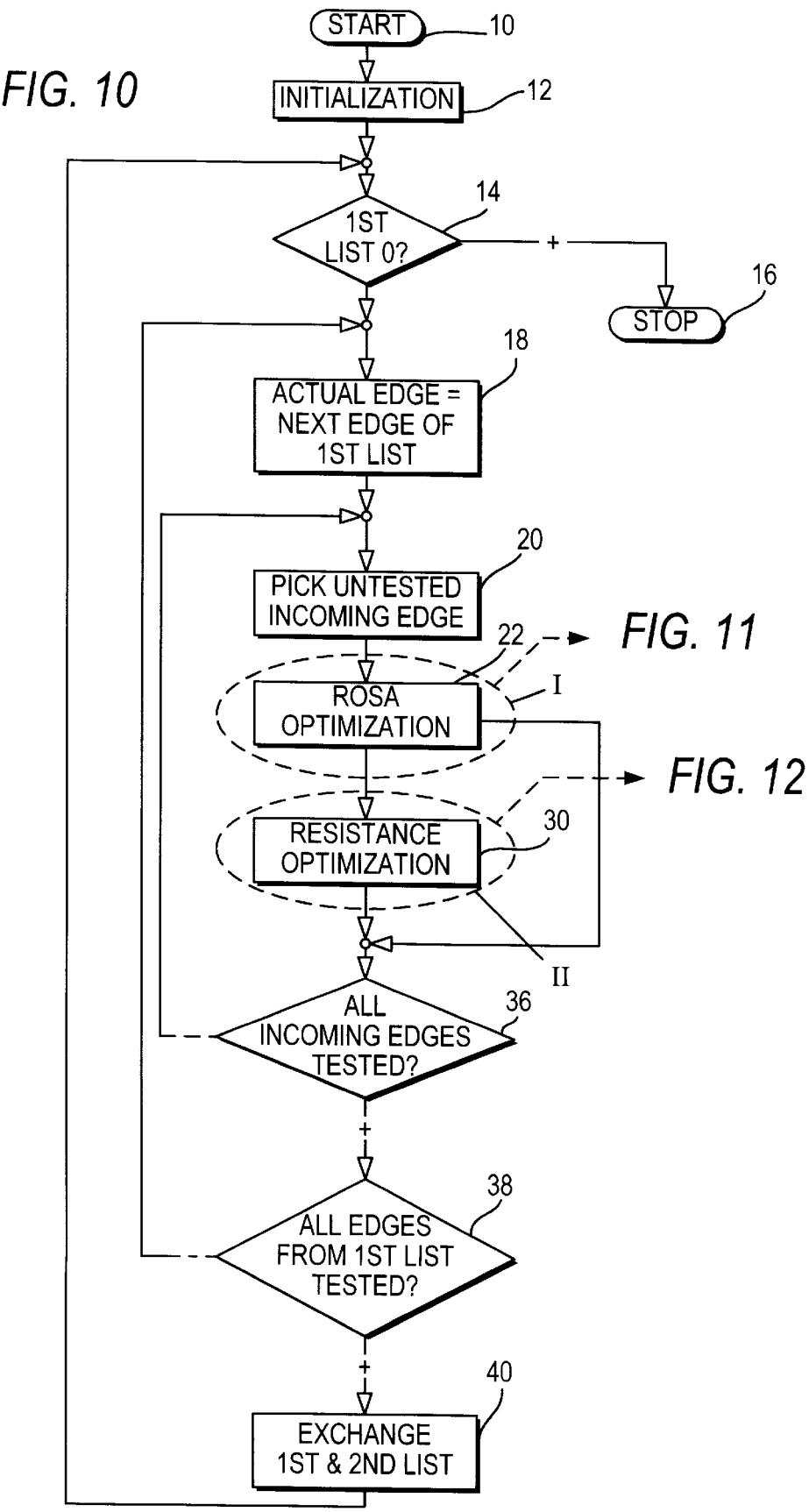
FIG. 10 is a flow chart of a preferred embodiment of the method for determining a route according to the invention.
Figure 11:
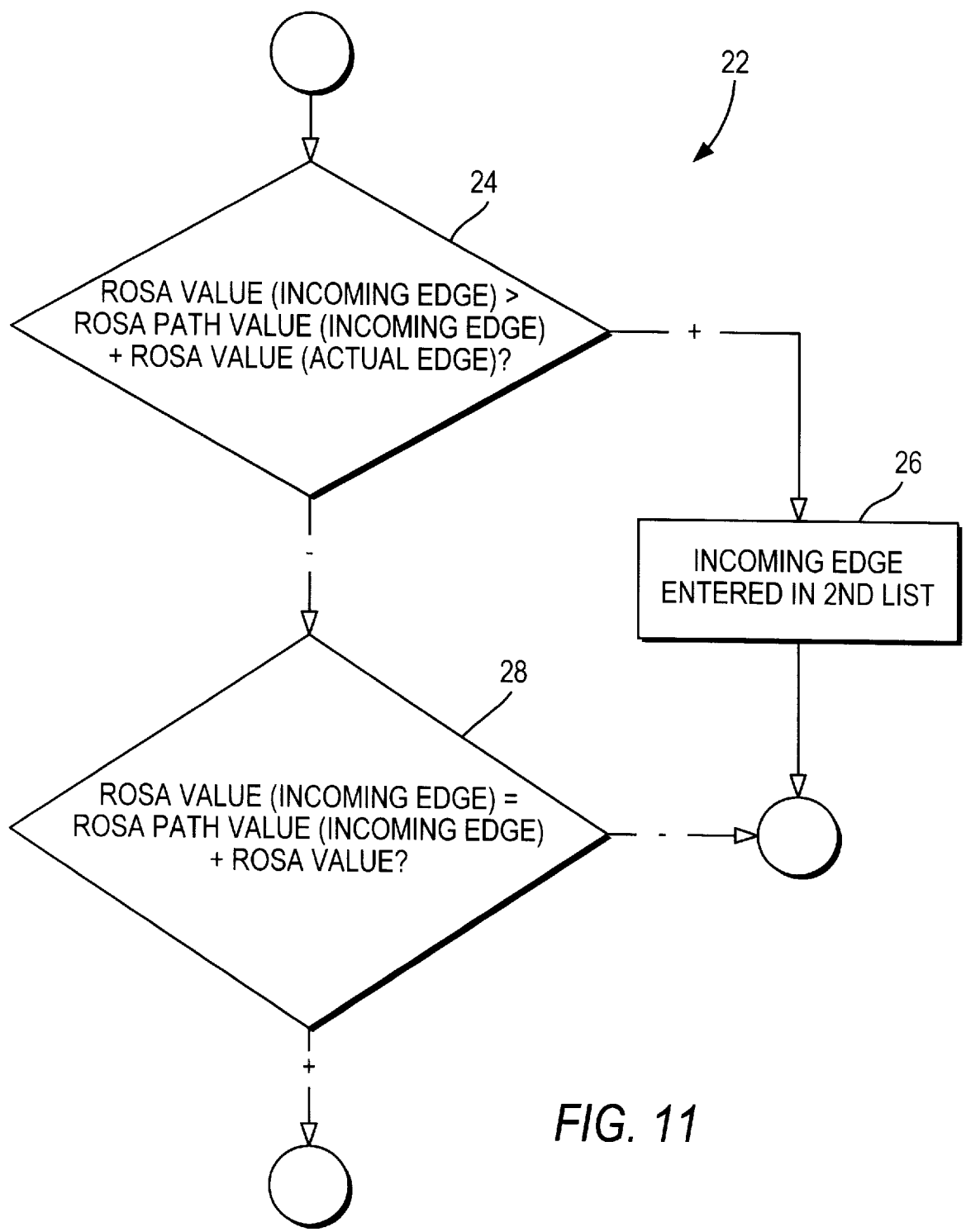
FIG. 11 is a flow chart of details I of the embodiment shown in FIG. 10.
Figure 12:
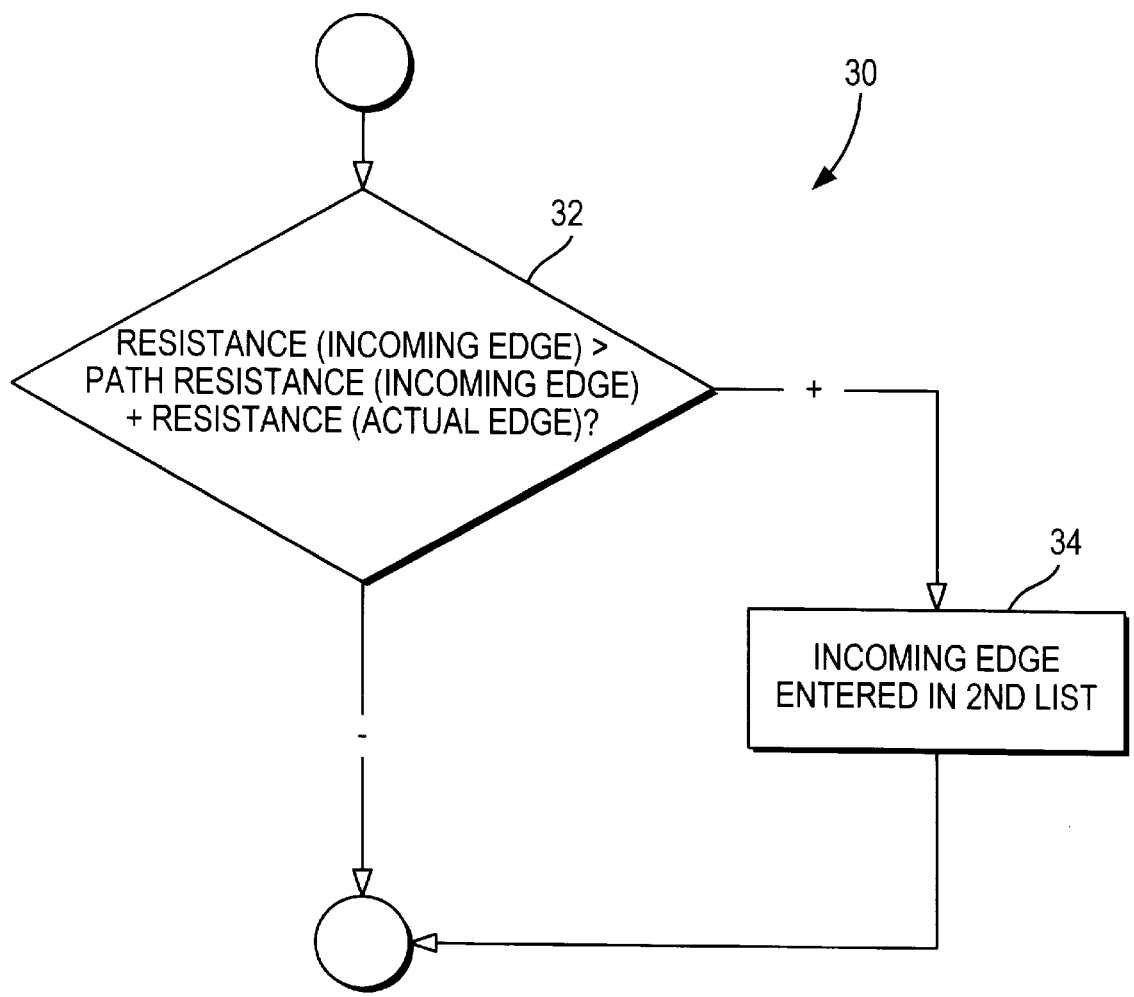
FIG. 12 is a flow chart of details II of the embodiment shown in FIG. 10.

FIGS. 10 to 12 show a flow chart for the method according to the invention. The branch "yes" indicated with a "+" stands for a positive result and the branch "no" indicated with a "−" stand for a negative result in the respective yes/no conditional jump test. In FIG. 10 the method starts with step 10 and in step 12 an initialization step occurs in which the destination edge is entered into a first list and a second list is initialized to be a null list. Furthermore the route table is initialized. In the following step 14 whether or not the first list is null is tested. If it is determined that the first list is null in step 14, the method ends at step 16. Otherwise the next edge from the first list is fetched in step 18 and defined as the actual edge. After that in step 20 a still not tested incoming edge of the actual edge defined in step 18 is selected and a ROSA optimization occurs in step 22, which is apparent in the details from FIG. 11. In step 24 the ROSA optimization condition, ROSA value(incoming edge)>ROSA path value (incoming edge)+ ROSA value (actual edge), is tested. If this condition is fulfilled, the actual tested incoming edge is entered in the second list in step 26 and the ROSA value and the resistance value of this incoming edge in the route table are actualized and finally the actual edge is entered as the following edge of the incoming edge.

In the event that step 24 results in a "no", whether or not

ROSA value(incoming edge)=ROSA path value (incoming edge)+ ROSA value (actual edge)

is tested in step 28. If this is not the case, the method continues once with step 36, otherwise a resistance optimization test occurs in a following step 30. This is apparent from the detail shown in FIG. 12. In a step 32, whether or not resistance (incoming edge)>path resistance (incoming edge)+resistance (actual edge)

is tested in step 32. In case the result is negative, the method continues in step 36, otherwise the incoming edge is entered in the second list in step 34, the ROSA value and the resistance value in the route table are actualized and the actual edge is entered as the following edge. After that the method continues with step 36, in which whether or not all incoming edges belonging to the instant actual edge were already processed is tested. If that is not the case, the method branches to step 20, otherwise it continues with step 38, in which whether or not all edges from the first list were tested is tested. If the latter is not the case, the method branches to step 18, otherwise the first and the second list are exchanged in step 40 and the new second list is initialized to the null list and the method jumps back to step 14.

In a possible alternative embodiment instead of a common accumulation of the path portions to be avoided a separate determination in a separate counter or ROSA values occurs. If one introduces ROSA values for the express highway portions, toll portions and ferry traveled portions of the route, the priority of the categories to be avoided is established by a sequence of three ROSA optimization tests following each other. The prioritizing, i.e. sequence of ROSA optimization tests, is established in advance or configured by a user.

While the invention has been illustrated and described as embodied in a method of determining a route from a starting point to a destination in a route network, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

I claim:

1. A method of determining a route from a starting point to a destination in a route network, said route network being represented by a group of straight edges and nodes in a memory, wherein each of said straight edges is correlated with a respective path resistance and the route is defined as a successive sequence of said edges and said successive sequence of said edges is determined by minimizing a resistance equal to the sum of all of said path resistances; wherein each of said edges is associated with at least one traffic-way-type path resistance value, wherein at least one traffic-way-type resistance value is first minimized during determination of a portion of the route from one of said edges to a following one of said edges and only in the case that said traffic-way-type resistance value does not increase or decrease from the one edge to the following edge is a minimization of the resistance performed for said portion of said route.

2. The method as defined in claim 1, wherein said traffic-way-type path resistance value for a respective one of said edges gives a sum of all paths on which said respective one of said edges has a predetermined traffic-way-type.

3. The method as defined in claim 2, wherein said route network is a road network and said traffic-way-type designates an express highway, country road, ferry route, through street or tunnel.

4. The method as defined in claim 1, wherein said traffic-way-type path resistance value for a respective one of said edges specifies a frequency of accidents, a number of radar traps or a number of lights.

5. The method as defined in claim 1, wherein said traffic-way-type path resistance value for a respective one of said edges specifies a physical property of said respective one of said edges.

6. The method as defined in claim 5, wherein said physical property is an amount of pollution associated with said respective one of said edges.

7. The method as defined in claim 5, further comprising providing a navigation device containing said memory and supplying said physical property to said navigation device for determination of said traffic-way-type path resistance value by means of vehicle telematics.

8. The method as defined in claim 7, wherein said physical property is supplied on-line by a service provider.

9. The method as defined in claim 7, wherein said physical property is supplied via GSM.

10. The method as defined in claim 7, wherein a polygon area on a digital map is defined in which all of said edges have a predetermined one of said physical properties and said polygon area on said digital map and said predetermined one of said physical properties are supplied to said navigation device.

11. The method as defined in claim 1, further comprising selectively activating or deactivating consideration of at least one of said at least one traffic-way-type path resistance value during route determination.

12. The method as defined in claim 1, further comprising determining said route iteratively from a destination edge of said straight edges.

13. A method of determining a route from a starting point to a destination in a route network, said route network being represented by a group of straight edges and nodes in a memory, wherein each of said straight edges is correlated with a respective path resistance and the route is defined as a successive sequence of said edges and said successive sequence of said edges is determined by minimizing the sum of all of said path resistances; said method comprising a) setting up a route table in which a respective resistance value, following edge value and traffic-way-type value are entered for each of said straight edges in a forward direction and in a back direction;
b) setting all of said resistance values and said traffic-way-type values of the route table to infinity and clearing all of said following edge values;
c) setting said resistance value and said traffic-way-type value of a selected destination edge of said edges to zero;
d) storing the destination edge in a first list for already optimized edges;
e) setting up of an empty second list for edges to be optimized in a next step;
f) testing whether or not the first list is empty and halting said method when a positive result is obtained;
g) defining one of the edges from the first list as the actual edge;
h) defining all the edges interconnected with the actual edge as incoming edges;
i) testing for all incoming edges whether or not a traffic-way-type optimization condition, traffic-way-type value(incoming edge)>traffic-way-type path value (incoming edge)+traffic-way-type value (actual edge), is fulfilled and if said traffic-way-type optimization condition is fulfilled proceeding to step j), but not fulfilled jumping to step k);
j) entering a respective one of the incoming edges in the second list, setting the resistance value of the respective incoming edge in the route table to the sum (path resistance (incoming edge)+resistance (actual edge)), setting the traffic-way-type value of the respective incoming edge in the route table to the sum (traffic-way-type path value (incoming edge)+traffic-way-type value (actual edge)) and entering the actual edge as the following edge of the respective incoming edge and then jumping to step I);
k) rejecting the respective incoming edge if
    traffic-way-type value(incoming edge)<traffic-way-type path value (incoming edge)+traffic-way-type value (actual edge), or when
    traffic-way-type value(incoming edge)=traffic-way-type path value (incoming edge)+traffic-way-type value (actual edge), determining for the respective incoming edge whether or not a resistance optimization condition
    resistance (incoming edge)>path resistance (incoming edge)+resistance (actual edge),
    is fulfilled, and when the resistance optimization condition is fulfilled, entering the respective incoming edge in the second list, setting the resistance value of the respective incoming edge in the route table to the sum (path resistance (incoming edge)+resistance (actual edge)), setting the traffic-way-type value of the respective incoming edge in the route table to the sum (traffic-way-type path value (incoming edge)+traffic-way-type value (actual edge)) and entering the actual edge as the following edge of the respective incoming edge, but when the resistance optimization condition is not fulfilled rejecting the incoming edge;
l) setting another of the edges in the first list as the actual edge and jumping to step h), or jumping to step m) when all of said edges contained in the first list were already previously set as the actual edge; and
m) exchanging the first list with the second list, clearing the second list and jumping to step f).

14. In a method of determining a route from a starting point to a destination in a route network, said route network being represented by a group of straight edges and nodes in a memory, wherein each of said straight edges is correlated with a respective edge travel cost and the route is defined as a successive sequence of said edges and said successive sequence of said edges is determined by minimizing the sum of all of said edge travel costs, the improvement comprising associating each of said edges with a first travel cost in the form of at least one traffic-way-type path resistance value and also with a second travel cost in the form of a path resistance value, wherein at least one traffic-way-type resistance value is first minimized during determination of a portion of the route from one of said edges to a following one of said edges and only in the case that said traffic-way-type resistance value does not increase or decrease from the one edge to the following edge is a minimization of a resistance for said portion of said route performed.

* * * * *